Jan. 26, 1965     V. J. GRUMBLATT     3,167,295

SEAT SUSPENSION

Filed March 8, 1961

INVENTOR.

BY Victor J Grumblatt

Ralph Hammar
Attorney

3,167,295
SEAT SUSPENSION
Victor J. Grumblatt, Erie, Pa., assignor to Lord
Manufacturing Company, Erie, Pa., a corporation
of Pennsylvania
Filed Mar. 8, 1961, Ser. No. 94,320
3 Claims. (Cl. 248—399)

This invention is a resilient seat suspension in which the seating load is carried by a spring and a crank so arranged that as the load increases, the crank carries a progressively increasing proportion of the load.

Figure 1:
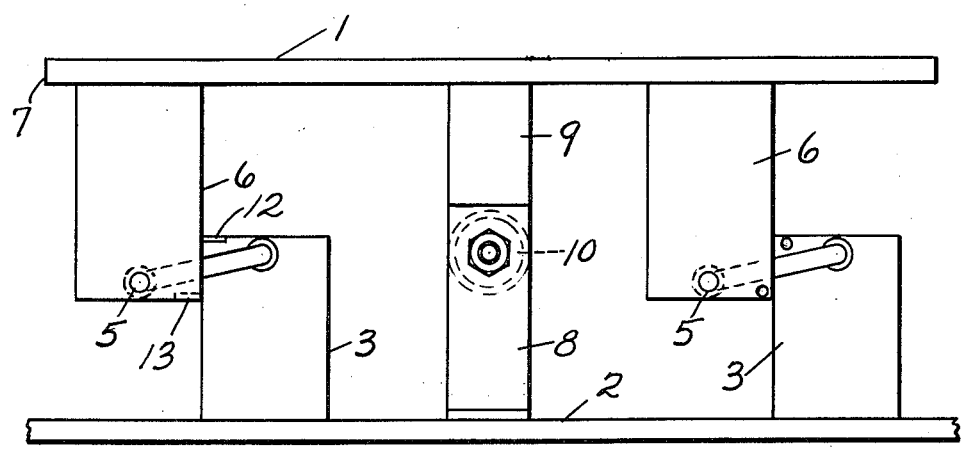
Figure 2:
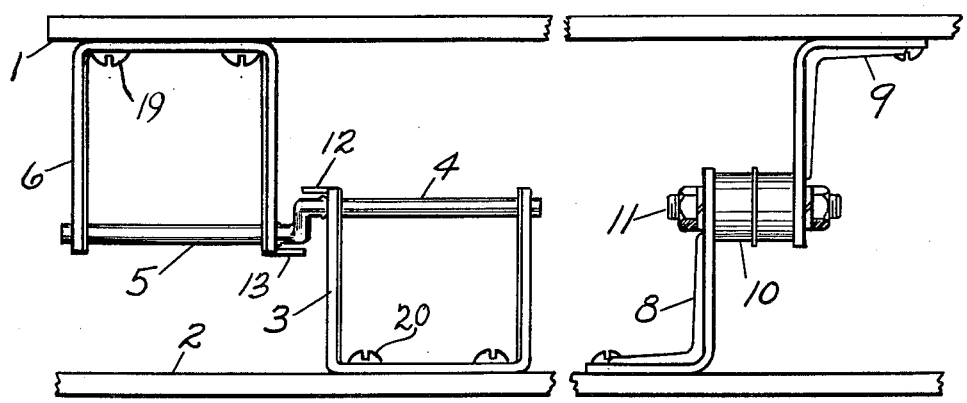
Figures 3, 4:
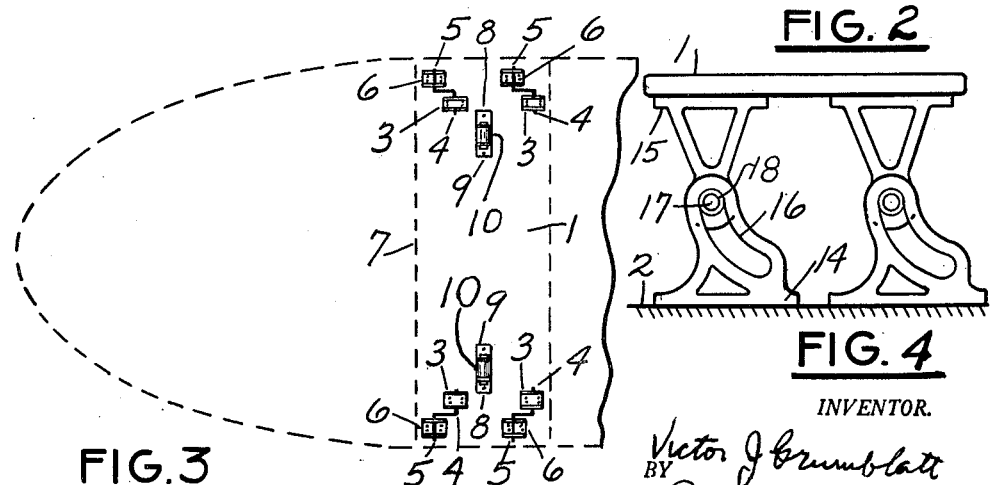

In the drawing, FIG. 1 is an end view of the seat suspension, FIG. 2 is a fragmentary front view on a reduced scale, FIG. 3 is a bottom view and FIG. 4 is a modification.

The invention is shown applied to a boat seat 1 carried by a supporting structure 2 at the bottom of the boat. On the supporting structure 2 beneath each end of the seat is a pair of upstanding brackets 3 in each of which is journaled a shaft 4 having an integral crank 5. The cranks are journaled in brackets 6 fixed to the underside of the seat. The shafts 4 and cranks 5 are parallel to each other and to the front edge 7 of the seat so that as the seat moves vertically there is a slight fore and aft movement. The seat, however, remains horizontal as it moves up and down because the cranks 5 and associated structure constitute parallelogram linkages.

Between each end of the seat and the supporting structure is a spring suspension which conveniently takes the form of bracket 8 fastened to the supporting structure, bracket 9 fastened to the underside of the seat and a rubber mounting 10 connected between the brackets by bolt 11. The rubber mounting 10 extends parallel to the front edge 7 of the seat so that it provides for both up and down as well as fore and aft movement of the seat, both movements being resiliently resisted by the rubber mounting. The spring suspensions are preferably located adjacent each end of the seat between the cranks 5. The location of the spring suspension is not critical. Nor is the spring suspension limited to rubber mountings. Other springs may be used.

In the no load position illustrated, the cranks 5 are slightly below the horizontal. When load is applied to any part of the seat, even at one extreme end of the seat, all of the cranks 5 move downward and the seat remains level. If the cranks were horizontal in the no load position, it would be possible for the cranks at the loaded end to move downward while the cranks at the opposite end moved upward, resulting in an unstable condition which is undesirable. With the cranks below the horizontal in the no load position, such instability is avoided. Stops 12 and 13 in the brackets 3 and 6 positively prevent the cranks 5 from going in opposite directions when the weight is applied to the extreme front or back edge of the seat.

As load is applied to the seat, the springs 10 deflect and at the same time the cranks 5 swing downward about the bearings for the shafts 4. At the start, the cranks carry substantially none of the load. As the cranks 5 approach the vertical position, they carry a progressively increasing proportion of the load. When the cranks 5 reach the vertical position, no further deflection of the spring is possible and all additional load is carried by the cranks. The combination of the cranks and spring support has an over all spring rate which increases with the seating load. The suspension accordingly will function with substantially a wide range of seating loads. The suspension has the further advantage that it will not easily pick up resonant motion.

In the modification of FIG. 4, the mounting 8–11 is unchanged and the brackets and cranks 3–6 are replaced by two pair of brackets 14 and 15 at each end of the seat, the brackets 14 being mounted on the supporting structure 2 and the brackets 15 being mounted on the under side of the seat. In each of the brackets 14 is a cam slot 16 receiving a pin 17 fixed in bracket 15. The pin may carry a sleeve 18 of material such as nylon which does not require lubrication.

In operation, the cam slots 16 and pins 17 are equivalent to the cranks 5. When the pins 17 are at the upper end of the slots, little or none of the seating load is carried by the pins and slots. As the seating load increases, the pins 17 move downward and since the inclination of the slots to the horizontal decreases, the pins rest on more gradual slopes and an increasing proportion of the seating load is carried by the pins and slots and when the pins bottom in the slots, all additional load is carried directly by the pins and slots.

By varying the contour of the slots 16, the proportion of the load carried by the pins and slots may be varied.

From one aspect, cranks 5 and the pins and cam slots 17, 16 and the associated structure are load carrying mechanism of variable mechanical advantage, the mechanical advantage from the point of view of load carrying ability being a minimum when the seat is unloaded and increasing to a maximum when the seat is fully loaded.

What is claimed as new is:

1. In combination, a seat adapted to extend crosswise of a boat or the like, a supporting structure beneath the seat, a spring and means for connecting the same in load carrying relation between the seat and the supporting structure, an independent parallelogram linkage at each end of the seat connected in load carrying relation between the seat and the supporting structure and having links pivoted on horizontal axes to the seat and to the supporting structure, the links of the linkage being slightly below horizontal in the no load position of the seat, stop means limiting upward movement of the links above said position slightly below horizontal and said links swinging downward toward the vertical as the seat is loaded to thereby carry a progressively increasing share of the seat load.

2. In combination, a seat, a first pair of brackets depending from the underside of each end of the seat, a supporting structure, a spring and means for connecting the same in load carrying relation between the seat and the supporting structure, a second pair of brackets upstanding from the supporting structure at each end of the seat, a pair of shafts at each end of the seat journaled on a horizontal axis in the second pair of brackets and having cranks journaled on a horizontal axis in the first pair of brackets at its end of the seat, the shafts at one end of the seat being independent of the shafts at the other end of the seat, the cranks being substantially parallel to each other and slightly below horizontal in the no load position of the seat, stop means limiting upward movement of said cranks above said position slightly below horizontal, and said cranks swinging downward toward the vertical as the seat is loaded to thereby carry a progressively increasing share of the seat load.

3. A seat suspension comprising a spring and means for connecting the same in load carrying relation between a seat and a supporting structure, and mechanism connected in load carrying relation between the seat and supporting structure having a mechanical advantage for carrying load increasing as the seat moves toward the supporting structure, in which the mechanism comprises pins and cam slots with the pins fixed to the seat and the slots having inclination to the horizontal decreasing as the pins move with the seat toward the supporting structure.

References Cited in the file of this patent

UNITED STATES PATENTS

| | | |
|---|---|---|
| 1,355,225 | Gynn | Oct. 12, 1920 |
| 1,647,247 | Pallenberg | Nov. 1, 1927 |
| 2,629,427 | McIntyre | Feb. 24, 1953 |
| 2,636,544 | Hickman | Apr. 28, 1953 |
| 2,935,313 | Momchilov | May 3, 1960 |

FOREIGN PATENTS

| | | |
|---|---|---|
| 626,408 | France | May 9, 1927 |